United States Patent Office 3,368,916
Patented Feb. 13, 1968

3,368,916
LIGHT RESISTANT FLAME RETARDANT
POLYMERS
Kiyoshi Hattori, Chicago, Ill., assignor to The Richardson
Company, Melrose Park, Ill., a corporation of Ohio
No Drawing. Filed May 28, 1964, Ser. No. 371,083
8 Claims. (Cl. 117—136)

ABSTRACT OF THE DISCLOSURE

An article of manufacture with resistance to burning and light degradation and composed of a styrene polymer, an organic bromine-containing flame retardant agent, a compound to prevent thermal degradation of the flame retardant agent, and having a clear coating with a light stabilizer to reduce yellowing of the article.

---

The present invention is directed to improving the light stability and weather resistance of flame retradant styrene polymers.

Improved flame retardancy, enhanced light stability and weathering in plastics are becoming increasingly more prominent as the applications for plastics such as polystyrene have gained greater public acceptance. Many plastics lack the desired characteristics which will enable them to be used in their natural state for many applications and, accordingly, if such plastics are to be employed it becomes necessary to modify them to meet rather stringent specifications involved in a wide variety of possible uses.

Homopolymers and copolymers of styrene, as well as mixtures of such polymers with other polymers, for example, the rubbery elastomers, normally have little, if any, resistance to burning. Accordingly, the use of such compositions, unless modified, is limited to applications wherein there is little likelihood of their being subjected to sufficient heat to cause flaming or burning. Additionally, styrene polymers, generally, have poor resistance to weathering and are degraded by ultraviolet light whereby they are susceptible to discoloring, crazing and acquire an unsightly appearance.

It is one of the primary objects of this invention to provide articles formed from styrene polymers which have improved resistance to burning, as well as enhanced weather resistance and which are further characterized by being substantially unaffected by ultraviolet light for extended periods.

A still further object is to provide light protective coatings for articles from styrene polymers of the "non-burning" or "self-extinguishing" type.

A further object is to provide styrene polymer-based articles having characteristics of the foregoing type which may be obtained without appreciable increase in cost.

In order to impart flame retardancy or resistance to burning, various modifying agents have been proposed as additives to styrene polymer compositions. Among such agents are organic chemical compounds containing halogens, particularly chlorine and bromine. Generally, chlorine-containing compounds must be used in larger quantities than bromine-containing compounds to obtain the same degree or level of flame retardancy.

However, even when using the preferred bromine-containing compounds as an aditive for styrene polymer compositions, certain limitations and disadvantages are present. One important disadvantage of bromine-containing compounds is their limited thermal stability. In general, such compounds must not be subjected to temperatures much above about 390° F. in order to prevent decomposition. When decomposition of these compounds occurs, it is usually evidenced by a darkening in color. Additionally, corrosive bromine-containing fumes are normally evolved above such temperatures which are harmful to equipment such as molds, presses, etc. wherein a composition is being processed.

Problems of the foregoing type are of special importance due to the fact that many styrene polymers are subjected to ram or screw type injection molding apparatus, wherein temperatures of the order of 450° F. or so may be present. As indicated, decomposition of many bromine-containing additives in styrene polymer compositions can be expected at these elevated temperatures.

Further, certain flame retardant additives, particularly when incorporated with crystal polystyrene, tend to discolor the resin and render it opaque or translucent rather than clear due to the nature of the additive and rather than as a result of any decomposition.

As disclosed in the copending application of Gavlin and Hattori SN 280,089, which is now abandoned, certain bromine-containing compounds are preferred as additives for use in imparting flame retardancy to styrene polymer compositions. Illustrative of such compounds are esters of 2,3 dibromopropanol-1 and, particularly, esters of this alcohol with phosphoric acid, cyanuric acid, carbonic acid and oxalic acid, as disclosed in the U.S. patent of Buchholz et al. 3,001,954, dated Sept. 26, 1961, which disclosure is incorporated herein by reference. Similarly, the acetals or ethers of 2,3 dibromopropanol-1 are contemplated, such as the acetals of this compound obtained from formaldehyde, acetaldehyde and the like. Acetals or ethers of the latter type are disclosed in the U.S. patent of Mueller-Tamm et al. 3,009,888, dated Nov. 21, 1961, which disclosure, also, is incorporated by reference. Additional examples of aryl-based bromine-containing compounds which may be used as flame retardants within the scope of this invention are 2,4,6-tribromophenol and tetrabromophthalic anhydride.

The bromine-containing compounds are usually added in an amount of about 4 to 8 percent by weight of the total compositions. As is generally the case, the bromine normally comprises about half of the weight of the additive.

Frequently, the flame retardants may be added to monomeric styrene or mixtures with other monomers, such as substituted styrenes, acrylonitrile, methacrylic esters, etc. prior to polymerization, as disclosed in the above mentioned patents. Alternatively, the flame retardant agents may be added to the polymerized product as well as to modified polymers having elastomers or the like incorporated, either by a graft process or a physical blend. In the latter compositions, illustrative elastomers are the butadiene-styrene copolymers and the more recent polybutadines. When forming graft polymers the elastomers are usually mixed with styrene monomer followed by polymerizing the monomer of the mixture. Blends are made by mixing on a mill polystyrene and a desired elastomer in the required proportions.

The aforementioned copending application also contemplates as a second major additive in combination with the flame retardant agent a thermal stabilizer which prevents an appreciable degradation of the bromine-containing compounds at temperatures up to about 450° F.

The stabilizers proposed are organo tin compounds and may be generically defined by the formula $$R_2Sn_nX_2$$

wherein X is a member of the class consisting of $$S-R'$$
$$S-CH_2COOR'$$
$$O-\underset{\underset{O}{\|}}{C}R'$$

and wherein R is an alkyl radical having 4 to 8 carbon atoms and R' is an alkyl radical having 4 to 12 carbon atoms. Illustrative compounds within the scope of the above formula are dialkyl tin mercaptides, such as dibutyltin bis-(octyl mercaptide) and dioctyltin bis-(dodecyl mercaptide), dibutyltin dithioglyolic ester, dioctyltin dithioglyolic ester, dibutyltin dilaurate and dioctyltin dioctoate. Also suitable are dialkyl tin maleates, these compounds being construed as being within the scope of the above formula and, particularly, the dibutyl specie.

The thermal stabilizers are normally added within the range of about 0.2 to 1.0 percent of the total weight of the composition, with a preferred amount being approximately 0.5 percent of the weight of the composition.

In general, the foregoing class of thermal stabilizers, for the most part, will not impair the optical clarity of styrene polymer compositions and are relatively resistant to degradation from ultraviolet light.

The stabilized products contemplated may be prepared by blending the additives into the polystyrene composition with any of the commercially available equipment. For example, the blending may be accomplished on mills having stainless steel rollers wherein the rollers may be heated to temperatures of between 250° to 350° F. depending upon the particular polystyrene base composition and the additives. Alternately, an extrusion type mixer may be used with the cylinder temperatures being of the order of 375° to 450° F., again depending on the particular components involved.

Preferably, all stabilizer additives are pre-mixed, where more than one is involved, prior to incorporation into the polystyrene composition.

The flammability test is conducted in accordance with the ASTM specification D635–56T, briefly summarized hereinafter. Normally, the test is performed on molded bars 0.5 by 0.5 by 5 inches and each such specimen is inscribed with a line 1 inch and 4 inches from one end of the specimen. The specimen is then clamped at one end in a support. A one inch blue flame from a ⅜-inch diameter Bunsen burner is applied to the free end of the specimen. At the end of 30 seconds the flame is removed while the specimen is permitted to burn. If no burning occurs the flame is again placed in contact with the specimen for a second period of 30 seconds and then removed. The extent of burning is measured along the lower edge of the specimen. If the specimen does not ignite on two attempts it is classed as "non-burning." In the event that a specimen, after ignition, does not burn to the 4-inch mark, it is classed as "self-extinguishing." A specimen which burns under the conditions of the test is determined to be "burning" and its burning rate is equal to 180/t (time to reach 4-inch mark) inches per minute.

As further disclosed in the foregoing copending application, the styrene polymer compositions may be further improved in their resistance to ultraviolet light by incorporating from about 0.2 to 0.4 percent by weight of a light stabilizing agent. While this technique has achieved certain desired results, it has not been found to completely fulfill the requirements of some applications. For example, the quantities of light stabilizing agent must necessarily be small to avoid undue cost. With such small quantities based on the total polymer it can be seen that there is a relatively thin distribution of light stabilizing agent throughout the polymer.

It has now been found that improved results of resistance to light degradation in combination with flame retardancy for styrene polymers of the type referred to in said copending application can be obtained by incorporating the light stabilizing agent in a relatively thin coating applied to the surface of a product molded or formed from the styrene polymer.

Certain prior art has proposed that selected coatings may be applied to articles formed of polystyrene and similar styrene polymers to enhance their surface qualities and in some instances improve resistance to ultraviolet light degradation. In particular, the patent to Bjorksten et al. Re. 23,753 discloses the use of various acrylate polymers for this purpose wherein the acrylate polymers are deposited on the surface of a polystyrene article, for example, from a solvent composition of the polymer.

In the present invention similar coating compositions are contemplated containing, however, an ultraviolet light stabilizing agent, thereby eliminating the need for such an agent in the base composition.

Due to the enhanced protection afforded by polymethyl methacrylate, this polymer is the preferred coating. Similar polymers, for example, polyethyl acrylate and polyethyl methacrylate may also be used as well as mixtures thereof. These polymers are disposed on or applied to an article formed of a styrene polymer from a solvent solution. Care must be taken to use a solvent which will dissolve the coating polymer without affecting or appreciably softening or dissolving the styrene polymer article on which the coating is to be applied. There are only a few such selective solvents, the principal ones being diacetone alcohol and methyl Cellosolve. These solvents may be used alone or as a mixture. In some instances a lower boiling solvent such as methyl alcohol may also be used, if desired, within the range of 0–30 percent by weight of the solvent component. In general, the solvent will comprise between about 75–95 percent of the coating composition, the remainder of the composition consisting principally of the acrylate polymer and between about 1 to 15 percent by weight, based on the weight of the coating polymer, of a light stabilizing agent.

The coating may be applied by brushing, spraying or dipping a previously molded or formed article or sheet to be protected. When applied the coating of polymer should preferably be about .0001 to .0015 inch thick. In general, the thinner the coating the higher the concentration of light stabilizing agent required to maintain a particular level of light stability. However, indoor requirements in this regard are less than those for outdoor uses and, hence, variations of film thickness and quantity of agent will be required for particular applications.

Due to the fact that the ultraviolet light stabilizing agent is concentrated in the coating, it need not be incorporated in the base articles as contemplated by the Gavlin et al. application. Further, by reason of concentration of the agent in the coating, less agent is required to achieve equivalent light stability characteristics as compared to the amount of light stabilizing agent employed in the styrene polymers disclosed in the aforementioned copending Gavlin et al. application.

Among the light stabilizers which may be employed are benzotriazoles such as 2(2'-hydroxy-5'-methyl phenyl) benzotriazole, and benzophenones, for example, 2,4-dihydroxy benzophenone and 2-hydroxy-4-methoxy benzophenone. In general, the light stabilizing agent should be capable of screening out substantially all of the ultraviolet light having a wave length of between about 300 to 400 millimicrons.

The generally accepted test for light stability of a product is the "Stability Toward Yellowing" test approved by IES, SPI and NEMA in 1958. This test contemplates a Fadeometer (Type FDA–R) carbon arc accelerated aging machine using a black panel temperature of 120° F.

and a spectrophotometer, such as the Hardy type or equivalent. Samples subjected to test are normally about 0.100 inch thick. The samples are exposed to the carbon arc for the desired length of time and are determined to have a Yellowing Factor (YF) in accordance with the following equation:

$$YF = 100 \times \frac{(T420 - T'420) - (T680 - T'680)}{T560}$$

wherein T is the transmission for the unexposed sample and T' is the transmission for the exposed sample at the indicated wave lengths expressed in millimicrons.

An acceptable Class C light stability requirement is a maximum Yellowing Factor of 15 for a minimum exposure of 500 hours.

Following is an example of a coated product made in accordance with the present invention:

*Example*

A base sheet 0.10 inch thick was formed from a composition comprising:

| | Parts |
|---|---|
| Polystyrene | 95.5 |
| Tris(2,3-dibromopropyl) phosphate | 4.0 |
| Dibutyltin bis(octyl mercaptide) | 0.5 |

To the foregoing sheet was applied a 0.5 mil film by brushing on the following composition:

| | Parts |
|---|---|
| Polymethyl methacrylate | 15.0 |
| 2(2'-hydroxy-5'-methyl phenyl) benzotriazole | 1.5 |
| Diacetone alcohol | 23.5 |
| Methyl Cellosolve | 60.0 |

To obtain a comparison the coated base sheet and a corresponding uncoated base sheet were exposed for 500 hours in a Fadeometer (Type FDA-R) as provided in the above described "Stability Toward Yellowing" test. The uncoated sample developed a very dark amber color and had a Yellowing Factor of 57 whereas the coated sheet was very faintly yellow and was found to have a Yellowing Factor of 4.3.

The foregoing base sheet was further characterized as being "self-extinguishing" when subjected to the inflammability test under the conditions provided by ASTM specification D536-56T.

Having described the invention and certain exemplary embodiments thereof, the same is only intended to be limited by the scope of the following claims.

I claim:
1. An article of manufacture characterized by its resistance to burning formed from a composition comprising a styrene polymer, an organic bromine-containing flame retarding agent in an amount sufficient to impart flame retardancy to the polymer, and an organo tin compound in an amount sufficient to prevent appreciable thermal degradation of said flame retarding agent at temperatures up to about 450° F., said organo tin compound being defined by the formula

$$R_2SnX_2$$

wherein X is a member of the class consisting of

S—R'

S—CH$_2$—COOR' and

O—CR'
‖
O and wherein R is an alkyl radical having 4–8 carbon atoms and R' is an alkyl radical having 4–12 carbon atoms wherein said article is provided with a clear coating containing a light stabilizing agent whereby it is further characterized by having a maximum Yellowing Factor of 15 after exposure of 500 hours as determined in accordance with the Stability Toward Yellowing test approved by IES in 1958.

2. An article as described in claim 1 wherein said flame retarding agent is an ester of 2,3 - dibromopropanol-1.

3. An article as described in claim 2 wherein the organo tin compound is a dialkyl mercaptide.

4. An article of manufacture formed from polystyrene containing an organic tin compound and an organic bromine-containing flame retarding compound which is stabilized to withstand a temperature of 450° F. without appreciable degradation by said organic tin compound, and having an acrylate polymer coating on a surface thereof between .0001 to .0015 inch thick, the stabilized organic bromine-containing compound being present in an amount sufficient to impart flame retardancy to the polystyrene, and said coating containing between 1–15 percent by weight of an agent capable of excluding substantially all of the ultraviolet light having a wave length within the range of between about 300 to 400 millimicrons.

5. An article as described in claim 4 wherein said coating is polymethacrylate containing 2(2'-hydroxy-5' methylphenyl) benzotriazole as a light stabilizing agent.

6. An article as described in claim 5 wherein the flame retarding compound is an ester of 2,3 dibromopropanol-1 and wherein a dialkyl tin maleate is employed as a stabilizer for said flame retarding compound.

7. An article of claim 1 wherein the flame retarding agent is present in a maximum amount of about 8 weight percent of the article, and the tin compound is present in a maximum amount of about 1 weight percent of the article.

8. An article as described in claim 4 wherein the stabilized organic halogen-containing compound is present in a maximum amount of about 8 weight percent of the article.

References Cited

UNITED STATES PATENTS

| Re. 23,753 | 12/1953 | Bjorksten et al. | 260—17 |
| 3,001,954 | 9/1961 | Buchholz et al. | 260—45.85 |
| 3,004,896 | 10/1961 | Heller et al. | 260—45.8 |
| 3,009,888 | 11/1961 | Mueller-Tamm et al. 260—88.2 X |

FOREIGN PATENTS

| 881,578 | 11/1961 | Great Britain. |

WILLIAM D. MARTIN, *Primary Examiner.*

T. G. DAVIS, *Assistant Examiner.*